(12) United States Patent
Schultz et al.

(10) Patent No.: US 6,948,094 B2
(45) Date of Patent: Sep. 20, 2005

(54) METHOD OF CORRECTING A MACHINE CHECK ERROR

(75) Inventors: Len Schultz, San Jose, CA (US); Nhon Toai Quach, San Jose, CA (US); Dean Mulla, Saratoga, CA (US); Jim Hays, San Jose, CA (US); John Fu, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 531 days.

(21) Appl. No.: 09/966,386

(22) Filed: Sep. 28, 2001

(65) Prior Publication Data

US 2003/0074601 A1 Apr. 17, 2003

(51) Int. Cl.⁷ .................................................. G06F 11/00
(52) U.S. Cl. .......................................... 714/15; 714/21
(58) Field of Search ............................. 714/15, 16, 10, 714/11, 12, 20, 21, 49–51

(56) References Cited

U.S. PATENT DOCUMENTS

| | | | | |
|---|---|---|---|---|
| 4,823,256 A | * | 4/1989 | Bishop et al. | ................ 714/10 |
| 5,664,104 A | * | 9/1997 | Shinjo et al. | ............... 709/224 |
| 5,748,873 A | * | 5/1998 | Ohguro et al. | ................ 714/11 |
| 6,393,582 B1 | * | 5/2002 | Klecka et al. | ................ 714/11 |
| 2003/0074601 A1 | * | 4/2003 | Schultz et al. | ................ 714/15 |

* cited by examiner

*Primary Examiner*—Dieu-Minh Le
(74) *Attorney, Agent, or Firm*—Blakely, Sokoloff, Taylor and Zafman (57) ABSTRACT

Processor implementation-specific instructions save a processor state in a system memory and attempt to correct the error. Control is then transferred to processor-independent instructions. Control is returned to the processor implementation-specific instructions which then return to an interrupted context of the processor by restoring the processor state.

20 Claims, 3 Drawing Sheets

METHOD OF CORRECTING A MACHINE CHECK ERROR

BACKGROUND OF THE INVENTION

Computer systems include a central processing unit (CPU) that provides the processor and the hardware necessary to support the operation of the processor. The processor typically executes a special program called an operating system. The operating system provides an interface that is used by user application programs that are executed on the computer system. The operating system provides a consistent interface for the user programs and hides the specific configuration details of the computer system from the user program.

Computer systems do not always operate without error. System error detection, containment, and recovery are critical elements of a highly reliable and fault tolerant computing environment. While error detection is mostly accomplished through hardware mechanisms, system software plays a role in containment and recovery. In prior art computer systems the operating system software typically attempts to handle errors that are detected in the operation of the computer system. Typically, an error will generate an interrupt which is a hardware jump to a predefined instruction address called an interrupt vector. The software at the interrupt vector uses processor mechanisms to store the state of the processor at the time the interrupt was generated so that execution may be later resumed at the point where the executing program was interrupted. The interrupt mechanism is not exclusive to error handling. Interrupts are also used to allow higher priority programs to interrupt the execution of lower priority programs. A typical use for interrupts is to allow the processing of data transfers as needed. The degree to which this error handling is effective in maintaining system integrity depends upon coordination and cooperation between the system CPUs, platform hardware fabric, and the system software.

The operating system may not be able to correct or even handle some errors that generate interrupts. For example, the operating system may not have access to all the information needed to correct the error or the error may prevent execution of the operating system software. These problems are aggravated by the increasing speed, size, and complexity of computer systems.

DETAILED DESCRIPTION OF THE INVENTION

Figure 1:
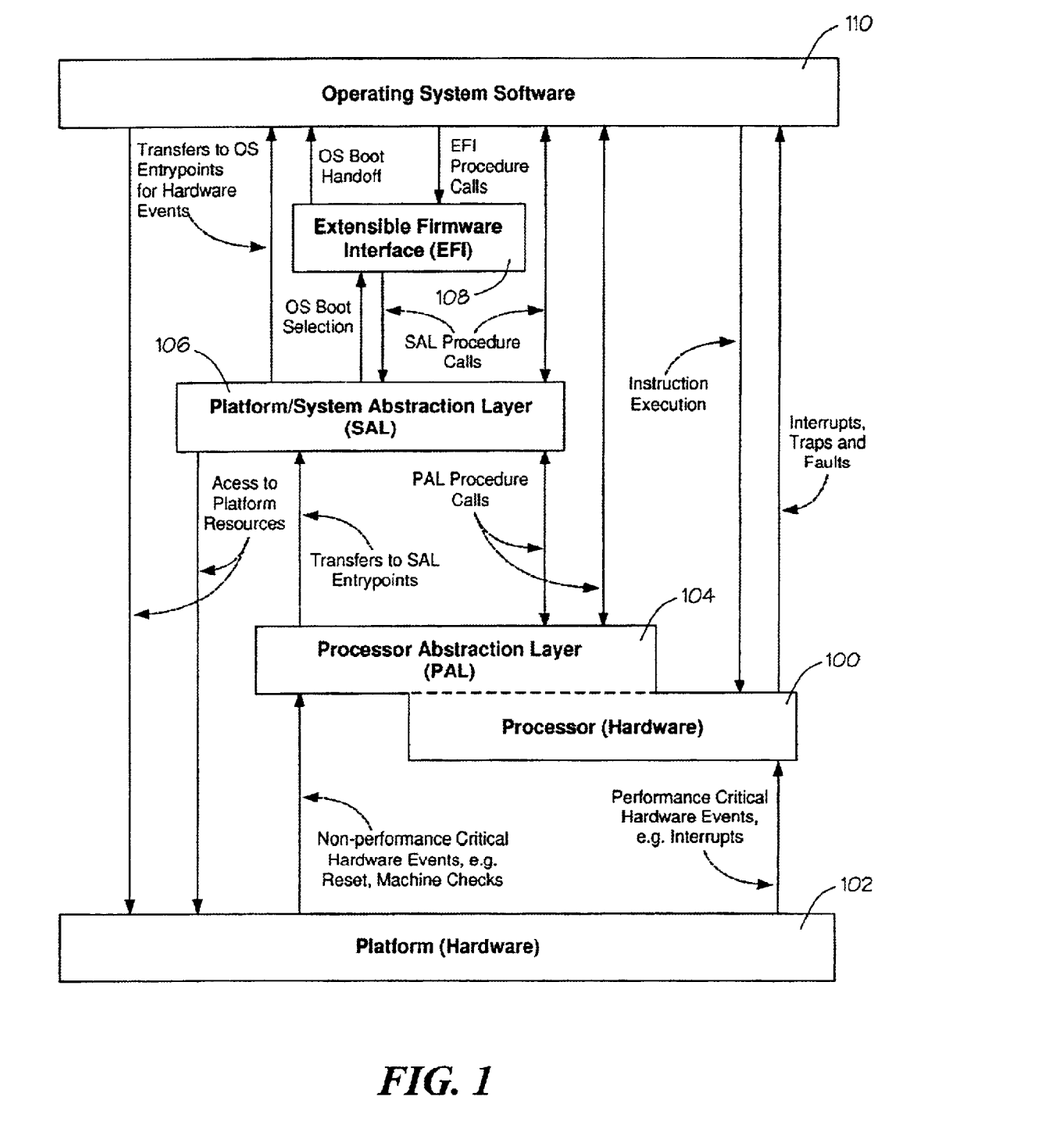
FIG. 1 is a block diagram of a central processing unit (CPU) that includes the present invention.

FIG. 1 is a block diagram of a central processing unit (CPU) that includes the present invention. The CPU includes a processor 100 which includes hardware devices for fetching and executing instructions. The processor 100 may include one or more processor units that can process instructions in parallel. The processor 100 is coupled to platform hardware 102 that provides hardware support for the processor 100. The platform hardware 102 may include memory hubs and controllers to connect the processor 100 to various forms of memory, such as random access memory (RAM), read-only memory (ROM), or cache memory. The platform hardware 102 may further include peripheral hubs and controllers to connect the processor 100 to peripheral devices, such as input devices, display devices, output device, or mass storage devices.

The present invention defines a new model for the interface between operating systems and platform firmware. The interface consists of data tables that contain platform-related information, plus boot and runtime service calls that are available to the operating system and its loader. Together, these provide a standard environment for booting an operating system and running pre-boot applications.

The CPU of the present invention further includes program instructions stored in various memories that are executed by the processor 100 to support the operation of the CPU. Portions of these instructions are stored in non-volatile memory, such as ROM, and are termed firmware. Other portions of these instructions are stored in volatile memory, such as RAM, and are termed software. Firmware is always present in the CPU. Software must be loaded into volatile memory after power is applied to the CPU before the software instructions can be executed by the processor 100. In general, program instructions are stored on a machine-readable medium. The machine-readable medium may be the source of instructions read by a processor or an intermediate medium that is used to transfer instructions to another machine-readable medium. Thus, a machine-readable medium includes any mechanism that provides (i.e., stores and/or transmits) information in a form readable by a machine (e.g., a computer). For example, a machine-readable medium includes but is not limited to read only memory (ROM); random access memory (RAM); magnetic disk storage media; optical storage media; flash memory devices; electrical, optical, acoustical or other form of propagated signals (e.g., carrier waves, infrared signals, digital signals, etc.). Thus, some or all of the present invention may be a machine-readable medium that includes instructions. Preferably, the firmware will be placed in a non-cacheable, non-volatile memory to provide a high level of immunity to errors.

Figure 2:
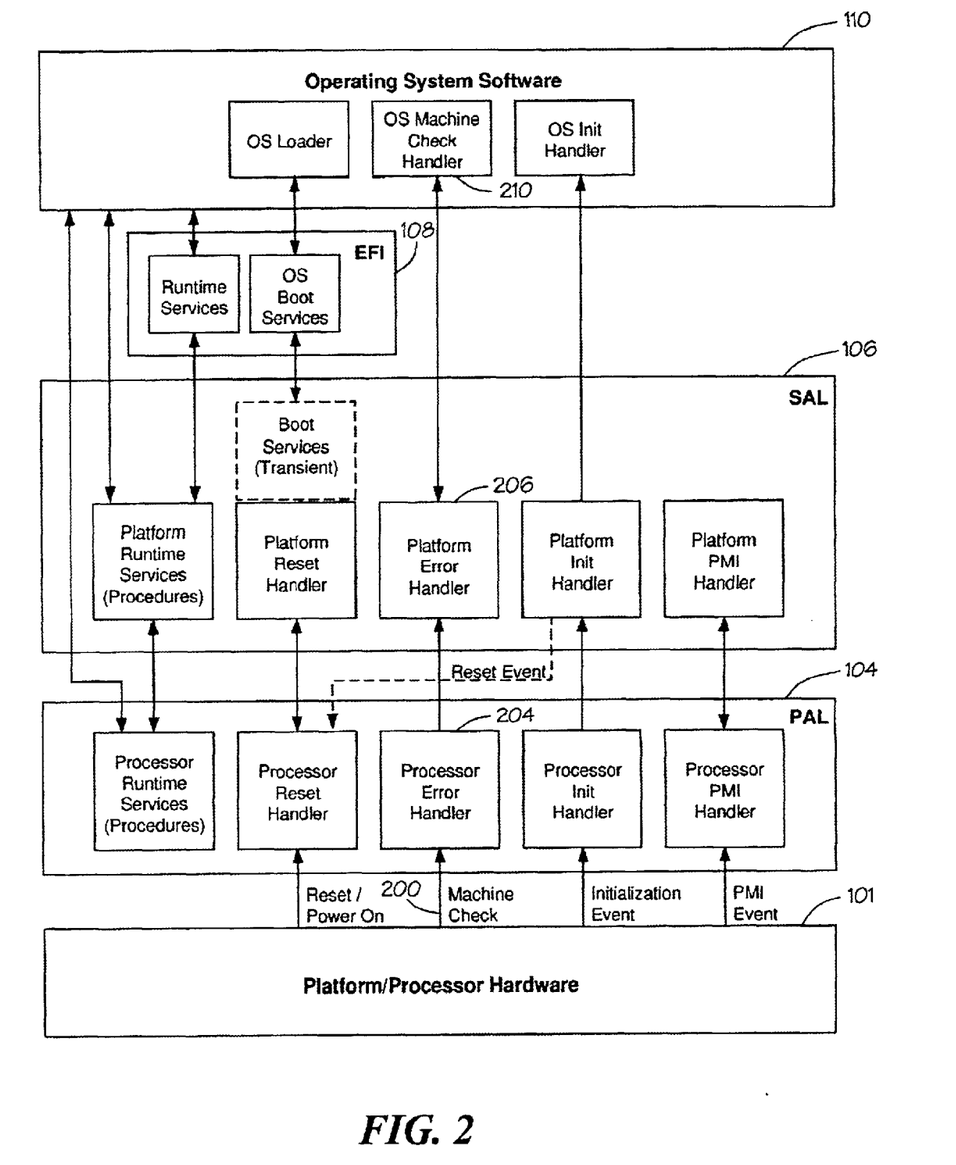
FIG. 2 is a block diagram showing the program instruction components in the CPU of FIG. 1.

The model for the interface between operating systems and platform firmware includes at least a processor abstraction layer (PAL) firmware component 104 and a system abstraction layer (SAL) firmware component 106. The model may also include an extensible firmware interface (EFI) component 108. PAL 104, SAL 106, and EFI 108 together may provide system initialization and boot, Machine Check Abort (MCA) handling, Platform Management Interrupt (PMI) handling, and other processor and system functions which would vary between implementations of the CPU. FIG. 2 shows the interaction between the processor and platform hardware 101 and the various functional firmware blocks.

PAL 104 encapsulates processor implementation-specific features and is part of the processor architecture. PAL 104 operates independently of the number of processor units that comprise the processor 100. PAL 104 provides a consistent software interface to access processor 100 resources across different processor implementations. SAL 106 is the platform-specific firmware component that isolates operating systems and other higher level software from implementation differences in the platform hardware 102. EFI 108 is the platform binding specification layer that provides a legacy free Application Programming Interface (API) to the operating system loader. Operating system software 110 is the application interface layer that provides a CPU independent interface for user level application software that is executed by the CPU.

Placing processor implementation-specific instructions in PAL 104 and platform-specific instructions in SAL 106 allows the PAL and SAL to perform their functions with full awareness of the implementation details of the processor and the platform respectively. The interface between PAL and SAL and between SAL and the operating system is defined to be independent of the processor and the platform. Thus, the operating system contains only instructions that are processor and platform independent. SAL contains only processor-independent instructions. The term "processor implementation-specific instructions" is used to mean a unit of one or more instructions that depend on the specific architecture or implementation of the processor to function correctly. The term "processor-independent instructions" is used to mean a unit of one or more instructions that function correctly regardless of the specific architecture or implementation of the processor.

The present invention provides a machine check architecture for error handling that is effective in maintaining system integrity by enabling coordination and cooperation between the processor 100, platform hardware 102, and the operating system software 110. The degree to which this error handling is effective in maintaining system integrity depends upon coordination and cooperation between the system CPUs, platform hardware fabric, and the system software. The machine check architecture provides error handling features for high reliability, availability, and serviceability. Error containment is the highest priority, followed by error correction without program interruption, and the recording of error information. When the platform or processor hardware 101 generates a machine check 200, control is passed to a processor error handler 204 in the PAL 104. In turn, control is passed to the platform error handler 206 in the SAL 106. Control may in turn be passed to the OS machine check handler 210 in the operating system software 110. If the error is corrected, control will be returned to the interrupted processor context. Otherwise, the system will be halted or rebooted.

The machine check architecture error handling model consists of different software components that work in close cooperation to handle different error conditions. PAL, SAL, and the operating system have error handling components, which are tightly coupled through a well defined interface. System errors may be handled by any of the following components: Processor Hardware; Platform Hardware; Processor Firmware (PAL); System Firmware (SAL); Operating System.

Hardware Error Handling: When the processor or platform hardware corrects an error, a notification of the corrected event may be signaled through a Corrected Machine Check Interrupt (CMCI) for processor-corrected errors or a Corrected Platform Error Interrupt (CPEI) for platform-corrected errors. The operating system may disable this automatic interrupt notification and periodically poll the firmware to collect corrected error events.

Figure 3:
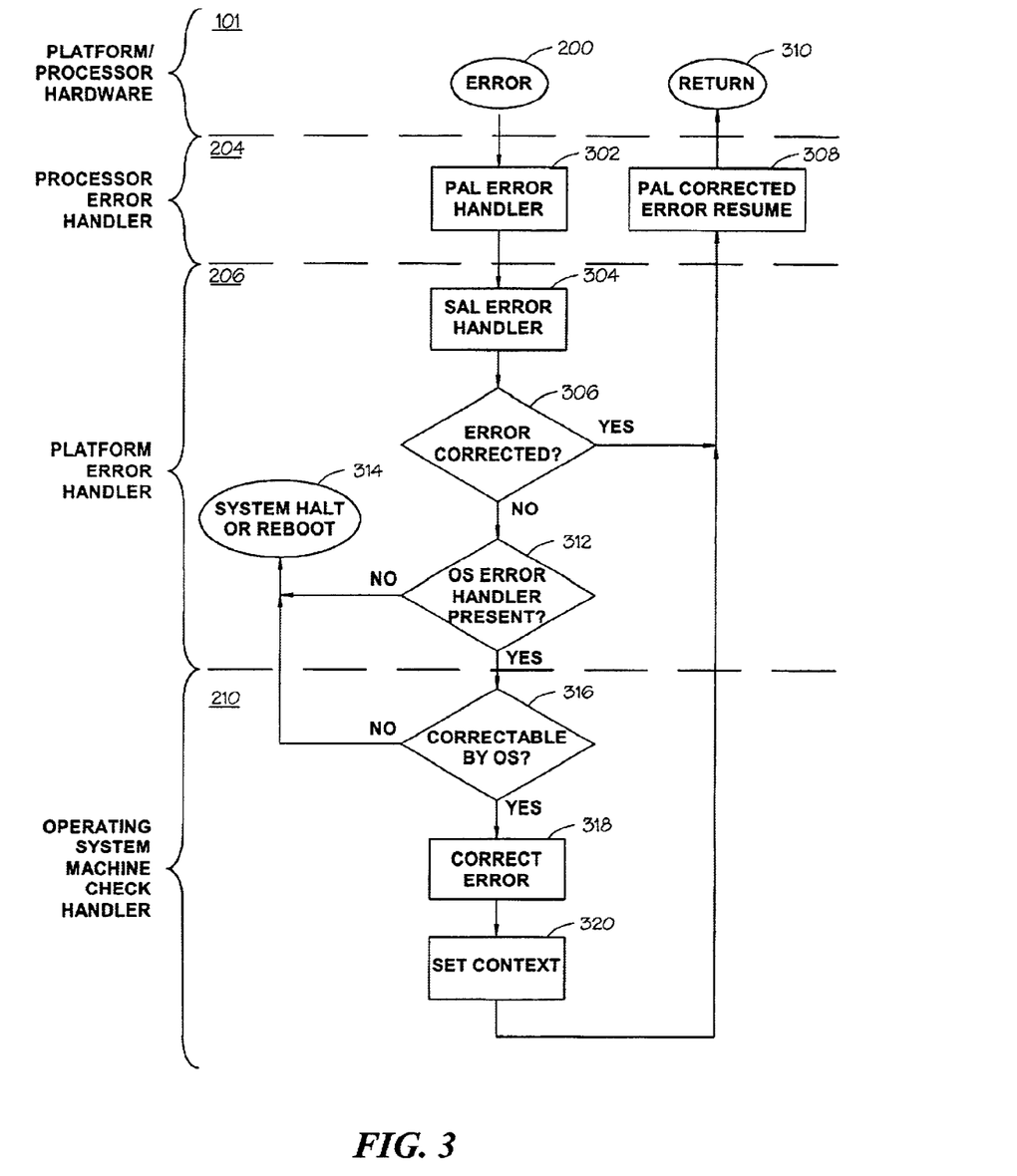
FIG. 3 is a flow chart of error handling and correction with the present invention.

Firmware Error Handling: FIG. 3 illustrates the machine check error handling flow. When the processor or platform hardware 101 detects an error that is not correctable directly by hardware, a Machine Check Abort (MCA) event 200 is triggered. The MCA event will pass control to processor error handler 204 in the PAL firmware 104. The PAL error handler 302 and SAL error handler 304 will correct any errors to the greatest extent possible. If the errors are corrected by PAL and SAL firmware 306, the SAL firmware returns control to the PAL firmware 308 to return control to the interrupted context of the hardware 310. In this case, the corrected errors require no operating system intervention for error handling.

If an error is not correctable by firmware 306, SAL attempts to pass control to the operating system. If an operating system error handler is present 312, SAL passes control to the OS machine check handler 210 in the operating system 110. If an OS error handler is not present 312, SAL halts or reboots the system 314.

Operating System Error Handling: If the error is not correctable by the OS 316, the OS may return control to SAL to halt or reboot the system 314. If the error is correctable by the OS 316, the OS the operating system will correct the errors 318, set context 320, and will pass control to the firmware 308 to return control to the interrupted context of the hardware 310.

If a legacy operating system, one that is not cognizant of the machine check architecture, is running on the processor, then the machine check is translated into a legacy operating system error to emulate the error architecture expected by the legacy operating system.

Errors detected are classified according to the error type and severity. The error events are classified as Machine Check Aborts or Corrected Error Events.

Machine Check Abort Events: MCAs are used to signal an error condition detected by either the processor or the platform. MCAs are asynchronous events and have higher priority than processor interrupts, faults, and traps. These types of errors if not corrected by firmware will pass control to the operating system for further handling. If the error condition is not correctable it may cause a system halt or reboot.

Corrected Error Events: A hardware or firmware corrected error condition surfaces as a corrected event through an interrupt or operating system polling. The two types of corrected events are processor-corrected errors known as Corrected Machine Checks (CMC) and Corrected Platform Errors (CPE). Hardware-corrected errors are corrected by the processor or platform hardware, and the hardware automatically triggers the appropriate interrupt for notification. Firmware-corrected errors first surface as MCA events that get transformed into a Corrected Event when the firmware performs the correction. The firmware that corrected the error will signal the corresponding corrected error event notification to the operating system. Alternatively the system may be set up to have the operating system poll for these events and no event notification is sent by firmware in this case.

A global MCA is an error condition that is broadcast across the entire system and affects all the processor units in the system, whereas a local MCA is an error condition that affects only the error-detecting processor unit. However, an error's scope is not visible to the operating system through any hand-off state information.

Global MCA: Global MCA results in a system-wide broadcast of an error condition. During a global MCA event, all the processor units in the system will be notified of an MCA. During a global MCA, all the processor units in the system will enter their respective MCA handlers and start processing the global error event. The system firmware and operating system layers will coordinate the handling of the error among the processors. Global MCAs may be signaled via bus signals.

Local MCA: The scope of a local MCA is limited to the processor unit that encountered the internal error or a platform error. This local MCA will not be broadcast to other processor units in the system. At any time, more than one processor unit in the system may experience a local MCA and handle it without notifying other processor units in the system. In certain cases, the firmware may rendezvous other processor units in the system for coordinating the error handling.

Processor errors are classified into five different categories of increasing severity and scope as shown follows: Corrected with CMCI/CPEI (Hardware Corrected); Corrected with Local MCA (Firmware Corrected); Recoverable with Local MCA; Recoverable with Global MCA; and Fatal with Global MCA.

Corrected with CMCI/CPEI (Hardware Corrected): All errors of this type are either corrected by the processor or platform hardware and have no impact on the currently executing process. Firmware does not handle this type of event. The operating system is notified of this event through a signaling mechanism for error record retrieval (CMCI/CPEI). An operating system can configure the system to disable the notification of the corrected error events, in which case it polls for these events through a SAL routine. Examples of this type of error are a correctable single bit ECC error in the processor cache or a correctable single bit ECC error on the front side bus.

Corrected with Local MCA (Firmware Corrected): This type of error is not corrected by the processor or platform hardware and must be corrected by firmware. On detecting such an error, the processor signals a local MCA, forcing control transfer to the firmware. Processor-detected errors of this type are corrected by PAL, whereas platform-detected errors of this type are corrected by SAL. The firmware handlers correct the error and resume the execution of the interrupted context. When the error is corrected by the firmware layers, the corrected event is notified to the operating system as a CMC or CPE event if the operating system (OS) enabled these events, otherwise the OS will poll for this information. An example of this type of error is an error that occurs in a data structure containing unmodified data. The firmware invalidates the affected lines in the structure and returns execution to the interrupted process.

Recoverable with Local MCA: Recoverable errors of the local MCA type cannot be completely corrected by either the hardware or firmware. This type of error requires operating system analysis of the error. The control and handling of this error is left to the operating system. Recovery is not always possible, depending on the capability of the operating system and the error record information provided to it by the firmware. When an error is not recoverable, the system may be rebooted to return it to a safe state.

Recoverable errors have the following characteristics: the error is contained (i.e., it has not been saved in persistent storage); critical system state is intact; the physical address that caused the error and the instruction pointer of the offending instruction are captured (the captured instruction pointer may or may not be precise based on the method through which the operating system may localize the instruction pointer on an MCA and the capability of the processor); and, the process and the system are restartable. An example of a recoverable error with local MCA is an error that returns incorrect data to a processor register. If the operating system can identify the offending process from the error information logged, it can terminate the process that needed to consume this data to recover. A platform may also signal a recoverable error detected by the platform components through an appropriate signaling mechanism.

Recoverable with Global MCA: These type of errors are similar to recoverable errors with local MCA except these errors are broadcast to the entire system via a signaling mechanism. On detecting a global error event condition, each of the processors enters its local MCA handler to perform error handling with a subsequent hand-off to the operating system. The eventual control and handling of this error are left to the operating system. To make a recoverable error global, platforms may have a mechanism to broadcast the local error events across the system. An example of a global error condition is a platform error condition asserting an error signal pin on all processors, assuming that the chipset has the ability to route and drive error signals to all the processors.

Fatal with Global MCA: This type of error cannot be corrected by the processor, platform, firmware, or operating system. The system must be rebooted. This type of error is broadcast to the system via a global event notification mechanism. On detecting a global error event condition, all the processors enter their MCA handlers. An error reset destroys the state of outstanding memory and bus transactions. After an error reset, the first bus transaction must be the fetch to the MCA handler. These error conditions require all processors to perform an error reset. An example of a fatal error condition is processor time-out expiration. This occurs when the processor has not retired any instructions after a certain time period. Such an error will cause a system reboot when enabled. A platform can also signal this error type through an error signal.

The machine check architecture requires PAL, SAL, and the operating system to share the responsibility of machine check handling. Machine check events initially go to PAL for handling. PAL has the following responsibilities when receiving a machine check:

using processor implementation-specific features to save the processor state in a system memory registered by SAL;

attempting to contain the error by requesting a rendezvous for all the processors in the system if necessary;

attempting to correct the error using processor implementation-specific features;

handing off control to SAL for further processing and logging;

providing processor error record information upon SAL request; and, returning to the interrupted context by restoring the state of the processor.

SAL has the following responsibilities during a machine check:

attempting to rendezvous other processors in the system if requested to by PAL;

processing MCA handling after hand-off from PAL;

getting processor error record information from PAL for logging;

issuing a PAL clear record request to clear the record and to enable further error logging;

initiating processor rendezvous on its own accord, if the error situation warrants one;

retrieving platform state for the MCA and retains it until the operating system handles it;

attempting to correct platform errors; if the error is not corrected, rendezvousing all the processors if the operating system sets the "always rendezvous" flag through SAL routine;

handing off control to operating system MCA handler for uncorrected errors; if the operating system MCA handler is absent or corrupted, then resetting the system; and, returning to the interrupted context through a PAL machine check resume routine.

The operating system depends on SAL to interact with PAL to get information about machine check errors for further handling. The responsibilities of operating system machine check handler may be categorized into initialization and run-time responsibilities. The operating system has the following initialization responsibilities:

if there are multiple processor units, registering Spinloop/Rendezvous and Wakeup Request Interrupt Vector;

registering an operating system MCA handler entry point;

initializing the CMC vector register to enable CMC interrupts on the processor and hook a handler (not required if the operating system chooses to poll for corrected processor errors);

initializing the Corrected Platform Error Interrupt (CPEI) vectors in the input/output hardware (not required if the operating system chooses to poll for corrected platform errors); and, enabling/disabling maskable interrupts on the slave processors.

The operating system has the following run-time responsibilities:

polling for CMC or CPE using a SAL request if the polling option is chosen;

if multiple processors enter MCA at the same time, electing a monarch processor to coordinate error handling;

retrieving error records from SAL;

recovering from error if possible;

identifying the end of all machine check handling and Wake-Up all slave processors from Spinloop;

clearing the SAL state information including the error records; and, resuming the interrupted context or branch to a new context by modifying the processor state.

Error Records: The errors records captured on a system are associated with error events. Error records return error information to the operating system. Corresponding to each event are processor and platform error records. Error records are important for error tracking and recovery. The SAL firmware (in conjunction with PAL) can maintain the error record information of all errors in a non-volatile local memory area. All corrected processor and platform errors events (CMC and CPE) have associated error records. Hence the error records are classified into:

MCA Records; and

CMC or CPE Records.

The error record may be a linked list structure that consists of multiple sections for each system component. An exemplary format of an error record for an event includes a record header block followed by one or more sections. Each section includes a section header block and a section body block. Each of the section has an associated globally unique ID (GUID) to identify the section type as being processor, platform bus, or other system-specific type. Error records may be retained across system reboots during fatal error conditions.

MCA record: Each MCA event in the system can have no more than one MCA error record per processor and one error record for the entire physical platform at any given point in time. While the software is handling the current MCA and further MCAs are held pending, no new MCA records are built. Error records for subsequent MCA events will be built and made available after the operating system completes the following sequence:

1. Retrieve the previous record.
2. Complete the MCA handling.
3. Initiate an explicit call to the SAL to clear the MCA records.
4. Unmask MCA interrupt detection on the processor.

During an MCA event, the error record returned by SAL through SAL_GET_STATE_INFO may contain valid sections for processor and/or platform errors. The different sections that are returned by SAL during this event depends on the event type and the SAL implementation.

CMC and CPE records: Each processor or the physical platform could have multiple valid corrected machine check or corrected platform error records. The maximum number of these records present in a system depends on the SAL implementation and the storage space available on the system. SAL may use an implementation-specific error record replacement algorithm for overflow situations. The operating system may need to make an explicit call to the SAL procedure SAL_CLEAR_STATE_INFO to clear the CMC and CPE records.

During a corrected error event, SAL returns error records consisting of appropriate error sections for the event type, namely a processor section for CMC and a platform section for CPE. In some situations, when platform errors are reported through synchronous MCA signaling by the platform (2×ECC or HF), SAL may correct the error and report it as a CPE. In this case, the error record for the event will consist of both processor and platform sections. The part of processor error section that is relevant for this case of CPE-transformed platform MCA is the virtual instruction pointer captured by the processor.

Multiple Errors: All the MCAs detected within a window before the processor masks machine check detection hardware (PSR.mc) may be lumped together as a single MCA condition, locally visible on that processor only. Multiple MCA events within a detection window on a particular processor may be reported as:

1. A single error, if the same error is detected multiple times in the same structure (cache, TLB or bus structural units).
2. A single error with an overflow indicator, if multiple unique errors are detected in the same structure. In this case the first detected error will be reported. The record-first-error policy only applies to recording resources that are shared among the errors.
3. Multiple unique errors in different structures.

Nested MCA: A nested MCA is an MCA that occurs after the MCA detection window is closed. All further MCAs occurring after the detection window are held pending and may be unrecoverable. The machine check architecture allows for multiple nested MCAs to occur on each processor, but only one MCA may be handled at a time. Note that errors detected and corrected by hardware trigger the optional corrected machine check interrupt (CMCI) event and are not considered to be MCAs or nested MCAs.

Multiple Processor System: Error handling may depend on the number of processors in a system. In a multiple processor environment, because of the possibility of a global MCA error or simultaneous local MCAs on multiple processors, firmware and OS MCA handlers must perform synchronization during error handling. The firmware may perform a rendezvous of the processors based on the error encountered or may be configured by the OS to always rendezvous with the SAL_MC_SET_PARAMS procedure. Likewise, the operating system may perform its own rendezvous of the processors based on the error encountered if it is not already done by the firmware.

Expected MCA Usage Model: In addition to the error handling model described above, the MCA architecture provides an MC Expected (MCE) configuration option for platform/software testing purpose. When this option is set, the PAL machine check handler will deviate from its normal handling and will not attempt to perform error recovery (HW error recovery action is not affected), but hands off control to SAL directly. This MCE option is enabled or disabled through the PAL_MC_EXPECTED procedure. The machine check architecture does not restrict the usage of the MCE option, but it is intended to be used for software diagnostics only.

Processor Error Handling: On detecting an internal error, the processor asserts a machine check. Platform errors that are uncorrected may also be directed to the processor to pass control to machine check architecture software. Error record information for the event is temporarily captured and maintained by the processor or platform components.

Processor Errors: Machine check errors are reported using five different structures. At any point in time, a processor may encounter an MCA or CMC event due to errors reported in one or more of the following structures:

1. Processor Cache Check
2. Processor TLB Check
3. System Bus Check
4. Processor Register File Check
5. Processor Microarchitectural Check Processor Cache Check: A processor architecture implementation may have several levels of on-chip cache. An implementation organizes a level of cache as separate instruction and data caches or as a unified cache. To make the error information independent of the processor's cache implementation, a processor may report error information in a generic fashion for recovery and logging. PAL_MC_ERROR_INFO may return the following information when a cache error occurs:

1. Instruction or data/unified cache failure identification.
2. Data or tag failure identification.
3. Type of operation that caused the failure.
4. The cache way and level of failed location.
5. Index of the failed cache line.
6. Physical address that generated the machine check.

Processor TLB Check: Processor architecture implementations may have several levels of on-chip translation lookaside buffers (TLBs). An implementation may choose to have separate instruction and data TLBs or a unified TLB. PAL_MC_ERROR_INFO may return the following information when a TLB error occurs:

1. Translation register or in the translation cache error identification.
2. Indication of whether the error occurred in an instruction or data/unified TLB structure.
3. Type of operation that caused the TLB MCA
4. Level of the TLB where the error was encountered
5. Slot number of the TR that experienced the MCA
6. Physical address that generated the machine check System Bus Check: Processor architecture implementations may report a bus machine check for system bus transaction errors or system bus agents reporting a global bus error. PAL_MC_ERROR_INFO may return the following information when a bus error occurs:

1. Size of the transaction that caused the machine check
2. Indication of whether this machine check was due to an internal processor error or due to an external bus notification
3. The type of bus transaction that generated the machine check
4. Identification of the requester and responder of the bus transaction that generated the machine check.

Processor Register File Check: Processor implementations may have large register files, which may be protected to detect errors. Errors encountered on protected register files may be returned in the register file check. PAL_MC_ERROR_INFO may return the following information when a register error occurs:

1. Register File ID and register number for the failure
2. Operation that generated the register file error Processor Microarchitecture Check: Processor implementations may have many internal arrays and structures that may not be architecturally defined yet may still be designed to detect errors. Any errors detected in architecturally undefined structures may be reported using the microarchitecture check. These error conditions may not be recoverable by operating system software but may be logged for serviceability. PAL_MC_ERROR_INFO may return the following information when a microarchitecture error occurs:

1. Structure ID, array ID, way and level where the error occurred.
2. Operation that triggered the error Processor Error Correlation: SAL may call PAL_MC_ERROR_INFO multiple times to retrieve all of the information associated with a machine check event. SAL calls PAL_MC_ERROR_INFO to get the error severity through the Processor State Parameter (PSP) and error map information through Processor Error Map (PEM). Subsequent calls may be made to obtain detailed error information. The PSP and PEM values returned by the PAL may have a global summary of the error, which enable SAL to identify and make subsequent PAL calls to get detailed error information for each structure. SAL may return processor error information for the processor on which the SAL_GET_STAT_INFO call is made. To get the error information for all processors, multiple SAL calls may be made to each processor.

Processor CMC Signaling: Corrected machine check events on a processor may be signaled using two different control paths:

1. Hardware Corrected Processor Error.
2. Firmware Corrected Processor Error

A machine check error corrected either by processor hardware or firmware may translate into a CMC condition with eventual notification to the operating system. The notification of the CMC condition to the operating system may only be necessary for recording the error information. The operating system may use this information to generate statistics. For the processor hardware or firmware to deliver the CMC interrupt to the operating system, the CMC interrupt must be enabled on each of the processors with CMC vector initialization.

On a processor-corrected error, a CMC event can be transferred to the operating system by two different methods. The operating system may either initialize the processor to generate an interrupt (CMCI) for automatic signaling of a CMC, or it may periodically poll the CMC condition through SAL_GET_STATE_INFO. The operating system can choose any low priority interrupt vector for this purpose by programming the processor's CMCV register.

Processor MCA Signaling: A machine check abort condition may be due to a processor error condition or an externally generated asynchronous platform BINIT#/BERR# signal or a synchronous Hard Error bus response, or Forced 2×ECC error on the front side bus (data poisoning). The processor detecting MCA or a platform chipset component may drive the BINIT# signal pin. The platform may drive BERR# to the processor. An MCA due to BERR# assertion may have no effect on the processor state, so it may be possible to resume execution of the interrupted context if the error is contained and corrected. However, an MCA due to BINIT# assertion may reset all outstanding transactions in the processor memory/bus queues, causing the processor to lose state information. This may prevent the system from recovering. A processor can assert different signal pins to communicate an error condition to the external platform components. When an MCA is localized to a processor, no external signalling will be visible in the platform.

Error Masking: System software may disable MCAs or corrected machine check interrupts by masking these conditions through the processor configuration registers. These capabilities are highlighted in Table A.

TABLE A

Processor Machine Check Event Masking

| Processor Register | Field | Event | Description |
|---|---|---|---|
| Processor Status Register (PSR) | PSR.mc | MCA | Mask or unmask machine check aborts on the processor. However, delivery of MCA caused by BINIT#is not affected. |
| CMC Interrrupt Vector Register | CMCV.m | CMCI | Mask or deliver the CMC interrupt. |

In general, it is not necessary for either SAL or the operating system to manipulate the PSR.mc bit. On taking an MCA, another MCA may be automatically masked by the processor HW and unmasked when SAL or the operating system returns to the interrupted context through PAL_MC_RESUME. The operating system may need explicit enabling or disabling of MCA signaling to handle special situations. A good example of this is when the operating system wants to bring the system to a rendezvous state when multiple MCAs are detected. The operating system or SAL could enable subsequent MCAs after the error record for the current MCA is dumped out to a nonvolatile storage area.

Error Severity Escalation: To simplify error handling or to give certain errors a different priority level, system software may escalate errors to a higher severity level. PAL firmware may permit SAL or the operating system to escalate errors. When this feature is enabled and supported, the escalated event signal may be driven out on the processor bus, for example on the BINIT# pin, and may be received by all platform components that are wired to these signals. Table B shows different possible events that may be elevated in severity.

TABLE B

Machine Check Event Escalation

| Processor Detected Machine Check Event | Available Escalation Option |
|---|---|
| Corrected Machine Check Events | May be promoted to an MCA condition. When this option is chosen, the processor signals a MCA on all CMC conditions. A promoted MCA behaves identically to a local MCA in that it can be further promoted to a BERR# or BINIT# condition. |
| All MCA Events | May be promoted to a BERR# or BINIT# error condition. When this option is chosen, the processor treats all MCA errors as BERR# or BINIT# error conditions. |
| Only BERR# Event | May be promoted to BINIT# error condition. When this option is chosen for the detecting processor, the processor treats all BERR# errors as BINIT# error condition. |

A particular processor architecture implementation may not support all of these capabilities. PAL_PROC_GET_FEATURES may report the existence of processor capabilities. The PAL_PROC_SET_FEATURES may allow the manipulation of the supported features.

Platform Error Handling: Detecting and reporting platform errors are platform specific. Platform hardware may record error information and return it to the firmware and operating system layers, which may have platform-specific error handling capabilities.

Platform Errors: MCA-enabled platforms may report several different error types, depending upon the platform design. The platform errors can be classified into three categories:

1. Memory errors
2. I/O bus errors
3. Platform specific

Each of the error types may be associated with a unique GUID for identification. When these platform errors are channeled through the processor MCA resources (BERR, BINIT, 2×ECC, and HF on the system bus), the processor error record may indicate all platform errors as external bus errors to the system software. The platform firmware is responsible for further querying the platform hardware to identify the source of the error and build an appropriate platform error record.

Since SAL is the platform-specific component of the firmware, it should have enough knowledge of the platform fabric to retrieve any error information from the chipset and possibly correct some errors with a hand-off to the operating system. The OS MCA, discussed below under "Error Record Management," in conjunction with SAL can effectively handle platform-detected errors. At any point in time, a platform could encounter an MCA/CPE event due to following types of errors:

1. Memory Errors
2. I/O Bus Errors
3. Platform Specific Errors

Memory Errors: Errors detected on the external memory subsystem, such as local DRAM 1×ECC, or 2×ECC errors, may be reported as platform memory errors. The errors detected on any platform level cache may also fall into this category.

I/O Bus Errors: Errors on I/O buses, such as a peripheral component interconnect (PCI) bus, may be reported as platform bus errors. Bus errors on component interconnect buses, such as the address and data memory controller buses and associated datapath components, may also be reported as platform bus errors.

Platform Error Correlation: The operating system may call SAL_GET_STATE_INFO multiple times to retrieve all of the information associated with a machine check event. The processor error record may provide the severity of error, which may be coupled with the platform error section returned by SAL. The processor-logged bus error information may have an external bus error flag, which gets set for errors detected and reported by the platform.

Platform-corrected Error Signaling: If OS polling is not used, corrected platform error events may be signaled using two different control paths:
1. Hardware-corrected platform errors
2. Firmware-corrected platform errors For hardware corrected platform errors the event notification may be sent to the operating system by asserting the interrupt line associated with the corrected platform interrupt vector. For firmware corrected platform errors the firmware may send an inter-processor interrupt with the corrected platform error vector number to a processor. The processor may signal a platform MCA condition through the assertion of external MCA signaling mechanism (BERR#, 2xECC & HF). If the SAL firmware corrects errors signaled in this way, a corrected platform error event will be signaled to the operating system if this type of signaling is enabled.

Scope: The scope of platform errors depends upon the platform and firmware implementations. Depending upon the platform topology, a single physical platform may consist of multiple processor nodes. A processor node is defined in this context to be a section of the platform that contains a set of processors connected by a bus with its own error event generation and notification. When SAL_GET_STATE_INFO is called for MCA or Corrected Errors for the platform, SAL returns the error record for the processor node associated with the processor on which the call is made.

SAL may specify the number of processor nodes in a platform by the number of entries for Corrected Platform Error interrupts in the ACPI table with a designated processor having a processor ID and EID. SAL may also indicate in the ACPI table which processors must be polled for platforms configured to not generate an interrupt on corrected errors. Returning error information on a processor node basis helps to efficiently manage platform resources for error event notification and error record building when the system has a large number of processors and platform resources. The operating system may need to call SAL_GET_STATE_INFO on each designated processor of a node to collate the error information for the entire physical platform. If the operating system uses a polling option for the platform corrected error event, it may call SAL_GET_STATE_INFO with argument type of CPE on each of the processor nodes to collate the error information for the entire platform.

Platform MCA Signaling: Depending on the severity of an error, a platform may signal an error to the processor either synchronously or asynchronously. Errors are synchronously reported through 2xECC or HF, while BERR# or BINIT# are used for asynchronous error reporting.

BERR# Pin Assertion: Since the processors do not reset their internal state, platform errors that are signaled this way may be recoverable. BERR# errors are global events when a platform design connects all the processor BERR# pins together in a system.

BINIT# Pin Assertion: Since the processors reset part of their internal state, platform errors signaled this way are not recoverable. BINIT# signaling causes a global MCA event (refer to Section 4.4.1 for further details).

Forcing 2xECC Data Error: Platforms may only use this method on a transaction that requires data return to the processors. On receiving a 2xECC error indicator, for cacheable data, the processor poisons and stores the data in the internal caches. A 2xECC error response is local to the receiving processor.

Hard Fail Response Error: The Hard Fail response is supported by the system bus protocol. On receiving such an error, the processor treats it in the same manner as a 2xECC data error. A Hard Error response is local to the receiving processor.

Global Signal Routing: Processor architecture implementations may use a multi-layer strategy for error containment at the instruction, process, node, and system levels. PAL firmware performs instruction level error containment. Process level error containment relies upon the operating system to terminate the process. At the node and system levels, error containment relies on PAL, SAL, and the operating system with the use of the BERR# and BINIT# pins to achieve error containment. The success of this error containment strategy depends upon cooperation between these firmware layers and the operating system. This section suggests a usage model of the BERR# and BINIT# pins.

Broadcast of BERR# and BINIT# across processor nodes may be used based on the needed platform topology and functionality. Irrespective of the nature of the signal routing, the impact of these platform signal routing choice shall be abstracted from the operating system. An example is that if a platform does not route BERR# signal across processor nodes, SAL must perform a SAL rendezvous of the processors on the neighboring processor nodes.

The BERR# pin may be used as a way for the platform to signal a recoverable platform MCA. The MCA component of SAL can specify the error recoverability for platform-asserted BERR# by reporting the appropriate error severity in the error record as being fatal or recoverable. If any platform components lost state information due to the assertion of the BERR# pin, then SAL must report the error as fatal.

The processor may drive the BERR# pin to notify other processors that there is an unrecoverable error and to get the other processors to stop their currently executing programs in order to reduce the chance of one of these processor seeing the same error, which would cause the processor to assert BINIT#. This increases the chance of allowing the firmware and operating system to get a good error log stored before having to re-boot the system. For very large multi-node systems, platforms may not want to tie the BERR# pins together across processor nodes, but can achieve a similar global even notification by using the rendezvous mechanism to coordinate error handling.

The BINIT# pin may be used for system level error containment. The processor may assert this pin for fatal errors that may cause loss of error containment. This pin may be tied together in a multi-node system. BINIT# assertion may be a global MCA event. To be consistent with the machine check architecture, it is preferred that the platform hardware generate a BERR# or 2xECC or HF for recoverable errors and a BINIT# for fatal errors. Since BERR# assertion allows the MCA handlers to make forward progress, some platforms may choose to report fatal errors through this means rather than raising BINIT#.

Error Masking: In addition to the processor error masking capabilities, the platform hardware may also provide an implementation-specific way of masking the platform BERR# and BINIT# signaling to the processor. The masking of error signals on the processor is in addition to the platform masking capabilities.

Error Severity Escalation: Platform errors that are visible to the processor may be escalated on a per processor basis by setting the processor configuration bits as shown in Table B. The chipset may also have capabilities to escalate all platform errors to BERR# errors (potentially recoverable) or BINIT# errors (non-recoverable).

Error Record Management: The management of the error records (MCA, CMC, and CPE) depends upon the SAL implementation. Records may have two different states:

1. Consumed
2. Not Consumed

Consumed error records have been read by the operating system and cleared using SAL_CLEAR_STATE_INFO. An operating system typically clears a record after it has been written to the operating system event log on the disk. In case of system reboot without an operating system's explicit clear (not consumed), the unconsumed records would still be available across system reboots for the operating system. SAL firmware may maintain consumed/unconsumed state flags for each of the error record in the NVM for their management. SAL may choose to implement "Consumed" and "Not Consumed" error records, however it is not architecturally required. A platform implementation with NVM support could keep all operating system-consumed error records in the NVM for utility software. So, if this implementation approach is taken, all error records can be made available to field service personnel through the utility software.

In response to different error events, SAL may build and maintain error records to provide them to the operating system. In response to the error events, the operating system is expected to retrieve error records from SAL for further processing. Each of the error records that the operating system processes falls into two main categories based on the event:

1. Corrected Error Event
2. Machine Check Abort Event

Corrected Error Event Record: In response to a CMC/CPE condition, SAL may build and maintain an error record for operating system retrieval. An operating system might choose different CMC/CPE event notification types during operating system boot by configuring the firmware through SAL_MC_SET_PARAMS. In response to the CMC/CPE event (CMCI or CPEI), the error record management by the firmware could follow the following sequence:

1. The operating system calls back SAL (interrupts enabled) and gets the corrected event error record. The SAL may write the error record to NVM and mark the error record as "Not Consumed" by the operating system.
2. The operating system clears corrected event error record (as an indication of the end of event handling) by clearing SAL_CLEAR_STATE_INFO. The firmware could do the following:
    a. SAL clears the error record from memory
    b. SAL saves the error record to NVM if not already done
    c. SAL marks the error record as in NVM as "Consumed" by the operating system
    d. SAL may perform garbage collection on NVM error records during the SAL_CLEAR_STATE_INFO call. The NVM garbage collection latency would not have any performance impact on the operating system since this call is made with interrupts enabled.

MCA Event Error Record: In response to an MCA condition, SAL builds and maintains the error record for operating system retrieval. During the OS MCA handling or at a subsequent point, the operating system would get the error record for the current MCA from the firmware. The error record management by firmware could follow the following sequence:

1. SAL MCA hands off to OS MCA after the following:
    a. SAL builds the error records.
    b. SAL writes the error record to NVM
    c. SAL marks the error record in NVM as "Not Consumed" by the operating system.
2. After OS MCA hand-off, operating system calls back SAL and gets the MCA error record.
3. The operating system clears MCA error record (as an indication of the end of MCA handling) through SAL_CLEAR_STATE_INFO. SAL would then do the following:
    a. SAL clears the error record from memory.
    b. SAL marks the error record in NVM as "Consumed" by the operating system.

Error Records Across Reboots: Unrecoverable error events may appear to the operating system as MCA conditions. In some cases, the operating system might not be able to write error records into its non-volatile storage. The error record remains unconsumed. In these situations, the operating system could reboot the system clearing the error record in the firmware memory. To take this situation into account, the firmware may have to maintain the error records across system reboots. The following is a typical sequence for the operating system to obtain the error record across reboots:

1. On reboot, the operating system requests for Not Consumed MCA/Corrected Event error records by calling SAL_GET_STATE_INFO. SAL will do the following:
    SAL will provide the error record if it exists in memory or, since the operating system has not cleared the error record yet, in the NVM.
2. The operating system clears the error record through SAL_CLEAR_STATE_INFO. SAL marks the error record in NVM as "Consumed" by the operating system.

If the OS fails to clear the log before another MCA surfaces, SAL may choose to overwrite the unconsumed NVM log, if there is not space for another record. The SAL implementation may additionally escalate the error severity when the error information is subsequently provided to the OS.

Multiple Error Records: It is possible for the platform to have multiple error records stored in the system NVM that are not yet consumed by the operating system. SAL chooses how to store the errors records in the NVM and in what order to return them. Here are some guidelines for typical implementations:

Corrected Error Records: Since the records pertain to corrected errors and the operating system uses them for logging purposes, the SAL_GET_STATE_INFO could return them in a first-in-first-out (FIFO). In any event, the error records are retrieved and cleared by the operating system one at a time.

MCA Error Records: An MCA record returned during an MCA hand-off to the operating system should always return the current record, because the operating system may use it for recovery. If multiple unconsumed MCA records are present in the NVM that do not pertain to the current MCA event, they may be used by the operating system for logging and hence the order in which the SAL_GET_STATE_INFO returns them can be in the order it chooses.

OS Error Recovery: Machine checks are handled first by PAL, then by SAL, and finally by the operating system. Firmware error handling may occur with virtual-to-physical address translation disabled. Firmware error handling should be independent of the system environment, guaranteeing a base level of capabilities for a platform. Platforms may provide error handling in SAL to provide uniform capabilities across different operating systems. Operating systems may provide additional error handling capabilities.

OS Error Handling Policy: The errors reported to the operating may have one of the following severity levels as defined above:

1. Continuable
2. Recoverable
3. Non-recoverable/Fatal

Handling Corrected Errors: Corrected errors are the simplest to handle. Since the error has already been corrected, the operating system only needs to respond to the event and record the error in persistent storage for error failure analysis. Errors may be analyzed to generate statistics and provide early component failure warnings.

Handling Recoverable Errors: Recoverable errors are MCA events that leave the processor or platform state corrupted. For recoverable errors the operating system may take one of the following courses of action for error recovery:

1. Terminate the offending thread and the affected threads. The offending thread is the thread that issues the offending instruction. Related processes may also need to be terminated. Error recovery by thread termination may not always be possible because of thread dependencies. When this is not possible, the operating system must reset the entire system to contain errors, since the offending thread should not be allowed to continue.
2. If the operating system can fix the error, the thread can be restarted from the offending point onwards. An example of this is an error on device driver-initiated operations. If the error is due to a driver-initiated operation, the driver may be able to recover by retrying or restarting the operation.

In both cases, the operating system needs to identify the errant thread and the affected threads from the information provided by PAL and SAL in the platform error logs.

Handling Fatal Errors: In the case of non-recoverable errors, the processor or platform has lost critical state information and the only recourse may be to reboot the machine. It may be possible for the operating system to record the error in persistent storage before the reboot, if the operating system can still access the storage device to record the error. To record the fatal error details, the firmware must be capable of storing the error records across operating system boots in a platform specific non-volatile storage area like NVRAM.

Identifying the Errant and Affected Threads: Recoverable errors may corrupt the architectural state and require that the errant thread and affected threads be terminated for error containment and recovery. Data poisoning is an important class of recoverable errors. For this reason, it is desirable that the operating system provide the thread termination capability.

The difference between the offending state and the affected state is important to note. The former refers to the offending thread's state when issuing the offending operation that causes the error when executed. The latter refers to the affected thread's state when the MCA is signaled and taken. In general, the offending state and the affected state are the same. But since there is a delay between the time the offending operation is issued and the time it is executed, it is possible that the offending state and the affected state are different. This case may occur when the offending thread issues the offending operation and then proceeds to make a system call. In this case, the offending state may indicate a user state and the affected kernel state. Conversely, a thread may issue the offending operation while in the kernel state with the MCA taken after execution is returned to the user state.

Preferably the processor architecture implementation will guarantee that MCAs will surface on a context switch, such as by signaling MCAs when the context switch code saves and restores the register context of a thread. This may limit the error states to the following cases:

Both the offending and the affected states belong to user states.

Both the offending and the affected states belong to privileged states.

The offending state belongs to a user state and the affected state belongs to a privileged state.

The offending state belongs to a privileged state and the affected state belongs to a user state.

For errors that require operating system intervention for thread or process termination, the affected thread is always the thread that is executed after the offending thread. For thread termination, the processor platform may provide the following information:

1. The physical data address of the offending operation. This should point to the data address of the offending memory operation.
2. The affected state including the instruction pointer.

Operating system recovery from errors through thread termination requires the following support:

1. The operating system should implement a data structure to determine whether a page belongs to a global, shared, or private page using the offending physical address provided by the hardware. Since there is a delay between the time a memory operation is issued and the time the MCA is taken, it is possible that another thread has changed the mapping of this table, rendering it useless. Therefore, the PAL code should have the capability to provides both the PA and the VA of the offending operations. The operating system should compare this mapping with those in its own mapping table.
2. Further, the operating system should pinpoint the offending thread and the affected threads when pages are global and shared. In the case of a private page, only the offending thread, and possibly its parent process, owning the page may need to be terminated.
3. Finally, the operating system should be able to determine if the affected thread is in a critical section. This may be determined from the interrupted instruction pointer, the privilege level, and the priority contained in the processor architecture Task Priority Register. How the operating system determines if the affected thread is in a critical section depends on the OS policy and architecture.

Table C shows the operating system action that must be taken to terminate a process or processes for error recovery.

TABLE C

Needed Operating System Action for Processes Termination

| Case | Property of Offending IP | Offending PA | Affected Thread in Critical Section | Operating System Action |
|---|---|---|---|---|
| 1 | x | Not Known | x | No error recovery is possible since the offending physical address is unknown |
| 2 | x | x | Critical | No error recovery is possible since the affected process is in a critical section |
| 3 | Precise | x | x | The operating system may terminate the offending thread based on the offending IP if the IP is synchronous. |
| 4 | Unknown | Global | Non-critical | The operating system must terminate all the threads that may use this page. Since this page is shared by all the processes, the entire system may have to be reboot. |
| 5 | Unknown | Shared | Non-critical | The operating system must terminate all the threads sharing the page. |
| 6 | Unknown | Private | Non-critical | The operating system must terminate the thread owning the private page | x = Don't care.

The following provides a pseudo code listing of operating system software that uses the present invention to recover from a processor cache memory error.

```
/*========================================================================*/
/* Definitions - These are provided to attempt to make the pseudo         */
/* code easier to read and are not meant to be real                       */
/* definitions that can be used.                                          */
/*========================================================================*/
/* Processor State Parameter is located in PSP=r18 at hand off from */
/* SAL to the OS_MCA handler. */
/* Processor State Parameter bit field definitions */
define TLB_Error = ProcessorStatParameter[60]
/* SAL Record Header Error Log Definitions */
#define Record_ID_Offset = 0
#define Err_Severity_Offset = 10
#define Recoverable = 0
#define Fatal = 1
#define Corrected = 2
#define Record_Length_Offset = 12
#define Record_Header_Length = 24
/* SAL Section Header Error Log Definitions */
#define GUID_Offset = 0
#define Section_Length_Offset = 20
#define Processor_GUID = E429FAF1-3CB7-11D4-BCA70080C73C8881
#define Section_Header_Length = 24
/* SAL Processor Error Record Definitions */
#define Validation_Bit_Structure
    Proc_Error_Map_Valid = bit 0
    Cache_Check_Valid = bits [7:4]
    TLB_Check_Valid = bits [11:8]
    BuB_Check_Valid = bits [15:12]
    Reg_File_Check_Valid = bits [19:16]
    MS_Check_Valid = bits [23:20]
#define Error_Validation_Bit_Length = 8
#define Check_Info_Valid_Bit = bi 0
#define Target_Address_Valid_Bit = bit 3
#define Precise_IP_Valid_Bit = bit 4
#define Check_Info_Offset = 0
#define Target_Address_Offset = 24
#define Precise_IP_Offset = 32
/* Cache Check Info Bit definitions */
#define PrecisePricLevel = bits [57:56]
#define PrecisePrivLevel_Valid = bits 58
/*=========================BEGIN=========================================*/
/* OS Machine Check Initialization          */
/*========================================================================*/
OS_MCA_Initialization( )
{
```

```
/* this code is executed once by OS during boot Register OS_MCA */
/* Interrupt parameters by calling SAL_MC_SETPARAMS */
    Install OS_Rendez_Interrupt_Handler
    Install OS_Rendez_Wakeup_Interrupt_Handler /* ISR clean up wrapper */
    Register_Rendez Interrupt _Type&Vector;
    Register_WakeUpInterrupt _Type&Vector;
    Initialize_CMC_Vector_Masking;
/* Register OS_MCA Entry Point parameters by calling SAL_SET_VECTORS */
    Register_OS_MCA_EntryPoint;
    Register_OS_INIT_EntryPoint;
}
/*===========================END=========================================*/
/*===========================BEGIN=======================================*/
/* OS Machine Check Rendez Interrupt Handler        */
/*=======================================================================*/
OS_Rendez_Interrupt_Handler( )
{
    /* go to spinloop */
    Mask_All_Interrupts;
    Call SAL_MC_RENDEZ( );
    /* clean-up after wakeup from exit */
    Enable_All_Interrupts */
    /* return from interruption */
    return;
}
/*===========================END=========================================*/
/*===========================BEGIN=======================================*/
/* OS Corrected Error Interrupt Handler (processor and platform)   */
/*=======================================================================*/
OS_Corrected_Error_Interrupt_Handler( )
{
/* handler for corrected machine check intr.*/
    /* get error log */
    if(ProcessorCorrectedError)
        Sal_Get_State_Info( processor);
    else
        Sal_Get_State_Info(platform);
    /* If saving of the error record is to disk or the OS event log. */
    /* then this is core OS functionality. */
    /* Save log of MCA */
    Save_Error_Log( );
    /* now we can clear the errors */
    if(ProcessorCorrectedError)
        Call Sal_Clear_State_Info(processor);
    else
        Call Sal_Clear_State_Info(platform);
/* return from interruption */
    return;
}
/*===========================END=========================================*/
/*===========================BEGIN=======================================*/
/* OS Core Machine Check Handler        */
/*=======================================================================*/
OS_MCA_Handler( )
{
/* handler for uncorrected machine check event */
    Save_Processor_State( );
    if(ErrorType |=Processor TLB)
        SwitchToVirtualMode( );
    else
        StayInPhysicalMode( );
    /* Assuming that the OS can call SAL in physical mode to get info */
    SAL_GET_STATE_INFO(MCA);
    /* check for error */
    if(ErrorType==processor)
    {
        if(ErrorType=processor TLB)
            // cannot do much;
            // reset the system and get the error record at reboot
            SystemReset( ) or ReturnToSAL (failure);
        else
            ErrorCorrectedStatus=OsProcessorMca( );
    }
    if(ErrorType==Platform)
        ErrorCorrectedStatus | OsPlatformMca( );
    /* If the error is not corrected. OS may want to reboot the machine */
    /* and can do it by returning to SAL with a failure return result. */
    If(ErrorCorrectedStatus==failure)
        branch=ReturnToSAL_CHECK
```

```
        /* Errors are corrected, so try to wake up processors which are */
        /* in Rendezvous. */
        /* completed error handling */
        If(ErrorCorrectedStatus=success && InRendezvous( ) ==true)
            WakeUpApplicationProcessorsFromRendezvous( );
        /* If saving of the error record is to disk or the OS event log, */
        /* then this is core OS functionality. */
        /* as a last thing */
        Save_Error_Log( );
        /* This is a very important step, as this clears the error record */
        /* and also indicates the end of machine check handling by the OS. */
        /* SAL uses this to clear any state information it may have related */
        /* to which processors are in the MCA and any State of earlier */
        /* rendezvous. */
        Call Sal_Clear_State_Info(MCA);
ReturnToSAL;;
        /* return from interruption */
        SwitchToPhysicalMode( );
        Restore_Processor_State( );
        /* return to SAL CHECK, SAL would do a reset if OS fails to correct */
        return(ErrorCorrectedStatus)
}
/*============================END=========================================*/
/*============================BEGIN=======================================*/
/* OS Platform Machine Check Handler           */
/*========================================================================*/
OsPlatformMca( )
{
    ErrorCorrected=True;
    /* check if the error is corrected by PAL or SAL */
    If(ErrorRecord.Severity==not corrected)
        /* call sub-routine to try and correct the Platform MCA */
        ErrorCorrected=Correctable_Platform_MCA(platform_error_type);
    Return(ErrorCorrectedStatus);
}
/*============================END=========================================*/
/*============================BEGIN=======================================*/
/* OS Processor Machine Check Handler          */
/*========================================================================*/
OsProcessorMca( )
{
    ErrorCorrected=True;
    /* check if the error is corrected by Firmware */
    If(ErrorRecord.Severity==not corrected)
        ErrorCorrectedStatus=TryProcessorErrorCorrection( );
    Return(ErrorCorrectedStatus);
}
/*============================END=========================================*/
/*============================BEGIN=======================================*/
/* Try Individual Processor Error Correction          */
/*========================================================================*/
/* Now the OS has the data logs. Start parsing the log retrieved from */
/* SAL. The sub-routine Read_OS_Error_Log will read data from th error */
/* log copied from SAL. An offset is passed to identify the data being */
/* read and the base pointer is assumed to be known by the */
/* Read_OS_Error_Log sub-routine just to simplify the pseudo-code. */
TryProcessorErrorCorrection( )
{
    /* extract appropriate fields from the record header */
    Record_ID = Read_OS_Error_Log(Record_ID_Offset);
    Severity = Read_Read_OS_Error_Log(Err_Severity_Offset);
/* It is unlikely that the OS can write to persistant storage in */
/* physical mode. If it is possible, the OS should do so. If it is not, */
/* the SAL firmware should still have a copy of the error log stored */
/* to NVRAM that will be persistant across resets. */
    if (Severity == Fatal)
        SystemReset( ) or return(failure);
    if (Severity == Corrected)
        return(ErrorCorrectedStatus=True);
/* These errors may be recoverable by the OS depending on the OS */
/* capability and the information logged by the processor. Call the */
/* sub-routine, OS_MCA_Recovery_Code and on return set up a min-state */
/* save area to return to a context of choice. The pal_mc_resume done */
/* through SAL allows the OS to turn on address translations and enable */
/* machine check aborts to be able to handle nested MCAs. */
    if (Severity == Recoverable)
    {
        ErrorCorrectedStatus=OS_MCA_Recovery( );
        Set_Up_A_Min_State_For_OS_MCA_Recovery(my_minstate);
```

```
        }
        return(ErrorCorrectedStatus);
}/* End of TryProcessorErrorCorrection Handler */
/*===========================END===========================================*/
/*===========================BEGIN=========================================*/
/* OS MCA Recovery Code        */
/*=========================================================================*/
/* At this point the OS is running with address translations enabled. */
/* This is needed otherwise the OS would not be able to access all of */
/* its data structures needed to analyze if the error is recoverable */
/* or not. There is a chance another MCA may come during recovery due */
/* to this fact, but running in physical mode for the OS is difficult */
/* to do. */
OS_MCA_Recovery( )
{
    /* Set up by default that the errors are not corrected */
    CorrectedErrorStatus = CorrectedCacheErr = CorrectedTlbErr =
    CorrectedBusErr = CorrectedRegFileErr = CorrectedUarchErr = 0;
    /* Start parsing the error log */
    RecordLength = Read_OS_Error_Log(Record_Length_Offset);
    Section_Header_Offset = OS_Error_Log_Pointer + Record_Header_Length;
    /* Find the processor error log data */
    Processor_Error_Log_Found = 0;
    /* traverse the error record structure to find processor section */
    while (Processor_Error_Log_Found == 0)
    {
        SectionGUID = Read_OS_Error_Log(Section_Header_Offset +
        GUID_Offset);
        SectionLength = Read_OS_Error_Log(Section_Header_Offset +
            Section_Length_Offset);
        y
        if (SectionGUID ==Processor_GUID)
            Processor_Error_Log_Found = 1;
        Section_Body_Pointer = Section_Header_Offset +
        Section_Header_Length;
        Section_Header_Offset = Section_Header_Offset + SectionLength;
        if (Section_Header_Offset >= RecordLength)
            InternalError( ); /* Expecting a processor log */
    }
/* Start parsing the processor error log. Section_Body_Pointer was set */
/* up to point to the first offset of the processor error log in the */
/* while loop above. Check the valid bits to see which part of the */
/* structure has valid info. The Read_OS_Error_Log sub-routine is */
/* assumed to know the initial pointer and just an offset is passed. */
/* This was done to allow the pseudo-code to be more readable. */
    Proc_Valid_Bits = Read_OS_Error_Log(Section_Body_Pointer);
    Section_Body_Pointer = Section_Body_Pointer + Validation_Bit_Length;
    /* Read the Processor Error Map if the valid bit is set. */
    if (Proc_Valid_Bits(Proc_Error_Map_Valid) ==1)
        Proc_Error_Map = Read_OS_Error_Log(Section_Body_Pointer);
    /* Extract how many errors are valid in the error log and determine
        which type */
    Cache_Check_Errs = Proc_Valid_Bits[Cache_Check_Valid];
    TLB_Check_Errs = Proc_Valid_Bits[TLB_Check_Valid];
    Bus_Check_Errs = Proc_Valid_Bits[Bus_Check_Valid];
    Reg_File_Errs = Proc_Valid_Bits[Reg_File_Check_Valid];
    Uarch_Errs = Proc_Valid_Bits[MS_Check_Valid];
    /* These sub-routines will return an indication of if the error can be
        corrected by killing the affected processes. */
    if (Cache_Check_Errs != 0)
    {
        /* Check to see if one or multiple cache errors occured */
        if (Cache_Check_Errs ==1)
            CorrectedCacheErr =
                Handle_Single_Cache_Error(Section_Body_Pointer);
        else
            CorrectedCacheErr =
                Handle_Multiple_Cache_Errors(Section_Body_Pointer)
                ;
    }
    if (TLB_Check_Errs != 0)
    {
        /* Check to see if one or multiple TLB errors occured */
        if (TLB_Check_Errs ==1)
        CorrectedTlbErr = Handle_Single_TLB_Error(Section_Body_Pointer);
        else
        CorrectedTlbErr =
        Handle_Multiple_TLB_Errors(Section_Body_Pointer);
    }
```

-continued

```
    if (Bus_Check_Errs != 0)
    {
        /* Check to see if one or multiple Bus errors occured */
        if (Bus_Check_Errs == 1)
            CorrectedBusErr =
                Handle_Single_Bus_Error(Section_Body_Pointer);
        else
            CorrectedBusErr =
                Handle_Multiple_Bus_Errors(Section_Body_Pointer);
    }
    if (Reg_File_Errs != 0)
    {
        /* Check to see if one or multiple Register file errors occured
        */
        if (Reg_File_Errs == 1)
            CorrectedRegFileErr =
                Handle_Single_Reg_File_Error(Section_Body_Pointer);
        else
            CorrectedRegFileErr =
                Handle_Multiple_Reg_File_Errors(Section_Body_Pointer);
    }
    if (Uarch_Errs != 0)
    {
        /* Check to see if one or multiple uarch file errors occured */
        if (Uarch_Errs == 1)
            CorrectedUarch_Err =
                Handle_Single_Uarch_Error(Section_Body_Pointer);
        else
            CorrectedUarch_Err =
                Handle_Multiple_Uarch_Errors(Section_Body_Pointer);
    }
    CorrectedErrorStatus = CorrectedCacheErr | CorrectedTlbErr |
            CorrectedBusErr | CorrectedRegFileErr |
            CorrectedUarch_Err;
    return(CorrecteErrorStatus);
} /* end OS_MCA_Recovery_Code */
/*===========================END==========================================*/
/*===========================BEGIN========================================*/
/* Single Cache Error Recovery Code          */
/*========================================================================*/
Handle_Single_Cache_Error
{
    /* Initialize variables to a known value */
    Cache_Check_Info = Target_Address_Length = Precise_IP_Info = -1;
    Cache_Check_Valid_Bits = Read_OS_Error_Log(Section_Body_Pointer);
    Section_Body_Pointer = Section_Body_Pointer
        +Error_Validation_Bit_Length;
    if (Check_Info_Valid_Bit == 1)
        Cache_Check_Info = Read_OS_Error_Log(Section_Body_Pointer +
            Check_Info_Offset);
    if (Target_Address_Valid_Bit == 1)
        Target_Address_Info = Read_OS_Error_Log(Section_Body_Pointer +
            Target_Address_Offset);
    if (Precise_IP_Info = Read_OS_Error_Log(Section_Body_Pointer +
        Precise_IP_Info = Read_OS_Error_Log(Section_Body_Pointer +
            Precise_IP_Offset);
    /* Determine if the Target Address was captured by the processor or */
    /* not. If it was, determine if it points to global memory, shared */
    /* memory or if it is private. If it points to a global memory */
    /* structure, then a system reboot is necessary. If it is shared */
    /* or private if may be recoverable. */
    // if no target physical address is captured, then we have to reboot
    if(Target Physical Address TarId=Not Valid)
        SystemReset ( ) or return(failure);
    // target physical address is captured, check with OS if this is
        global address page
    if(OsIsTargetAddressGlobal (TarId))
        SystemReset( ) or return(failure) // in global page, it is bad
    news
    /* Now we know that the target address does not point to shared */
    /* memory. Check to see if a precise instruction pointer was captured.
    */
    /* If it was then check to see if it is a user or kernal IP. If we */
    /* have the precise IP map to the processes and kill it, else we have
    */
    /* to kill processes based on target address. */
    // so far so good, TardID is in local page: Do we have precise IP?
    if(PreciseIP==true)
    {
```

```
            // yes, precise IP is captured, so take this branch
            if(OsIsIpInKernelSpace(IP))
            {
                // IP in kernal space
                KernelSpaceIpFlag=1;
                if(OsIsProcessCritical(IP,0) ==true)
                    SystemReset( );
            else
            {
                    // kill all non-critical OS processes at IP
                    OsKillAllProcesses(IP,0);
                    return(success);
                }
            }
            else
            {
                // IP is in user space
                UserSpaceIpFlag=1;
                // kill all shared user processes
                OsKillAllProcesses(IP,0);
                return(success);
            }
        }
        else
        /* We do not have precise IP, so try to map the Target physical */
        /* address to a processes. If the target address points to shared */
        /* data, then all sharing processes need to be killed. If the */
        /* target address points to a private page (global has been checked */
        /* above) then just kill the offending process. */
        {
            // Try and map Target Physical Address to a process data area
            if(PreviledgeLevel==Valid) // at user_level
            {
              // ipl=Instruction Priviledge level
              if(ipl==user_level) // at user_level
              {
                    // this is user priveledge level
                    OsKillAllProcesses(0, TarId);
                    return(rv);
              }
              else // kernel level
              {
        /* If the OS has a way to determine if the IP is in a critical part */
        /* of the kernal this can determine if the kernal process can be */
        /* killed or not. If the OS always puts critical kernal code in a */
        /* certain IP range, this could be a way it could determine. */
                    // this is kernel priviledge level
                    if(OsIsProcessCritical(0,TarId)
                        // OS critical process error, all bets are off...
                        SystemReset( ) or return(failure);
                    // good, can kill all non-critical porcesses using TarId
                    OsKillAllProcesses(0,TarId);
                    return(success);
                  }
              }
            else
                // sorry, don't have privilege level information, all bets
                    are off...
                SystemReset( ) or return(failure);
        }
        return(success);
}
/*========================END=====================================
```

What is claimed is:

1. A method comprising:

using processor implementation-specific instructions to save a processor state in a system memory when a machine check error is generated by a processor;

attempting to correct the error using processor implementation-specific instructions;

transferring control to processor-independent instructions;

receiving control from processor-independent instructions; and returning to an interrupted context of the processor by restoring the processor state;

wherein the processor implementation-specific instructions depend on the specific architecture of the processor to function correctly and the processor-independent instructions function correctly regardless of the specific architecture of the processor.

2. The method of claim 1, further comprising providing processor error record information obtained using processor implementation-specific instructions.

3. The method of claim 1, further comprising attempting to contain the error if a second processor is coupled to the processor by requesting a rendezvous between the processor and the second processor.

4. The method of claim 1, wherein receiving control from processor-independent instructions indicates that the error has been corrected.

5. The method of claim 1, further comprising obtaining an address of a location to save the processor state in the system memory provided by platform-specific instructions.

6. The method of claim 1, wherein attempting to correct the error using processor implementation-specific instructions is not done if an expected machine check indicator is set.

7. A machine-readable medium that provides instructions that, if executed by a processor, will cause the processor to perform operations comprising:
   using processor implementation-specific instructions to save a processor state in a system memory when a machine check error is generated by the processor;
   attempting to correct the error using processor implementation-specific instructions;
   transferring control to processor-independent instructions;
   receiving control from processor-independent instructions; and
   returning to an interrupted context of the processor by restoring the processor state;
   wherein the processor implementation-specific instructions depend on the specific architecture of the processor to function correctly and the processor-independent instructions function correctly regardless of the specific architecture of the processor.

8. The machine-readable medium of claim 7, wherein the operations further comprise using processor implementation-specific instructions to provide processor error record information requested by processor-independent instructions.

9. The machine-readable medium of claim 7, wherein the operations further comprise attempting to contain the error if a second processor is coupled to the processor by requesting a rendezvous between the processor and the second processor.

10. The machine-readable medium of claim 7, wherein receiving control from processor-independent instructions indicates that the error has been corrected.

11. The machine-readable medium of claim 7, wherein the operations further comprise obtaining an address of a location to save the processor state in the system memory provided by platform-specific instructions.

12. The machine-readable medium of claim 7, wherein attempting to correct the error using processor implementation-specific instructions is not done if an expected machine check indicator is set.

13. The machine-readable medium of claim 7, wherein the instructions provided by the machine-readable medium are not cacheable by the processor.

14. A central processing unit (CPU) comprising:
   a processor;
   a first machine-readable medium coupled to the processor, the first machine-readable medium including processor implementation-specific instructions dependent on the specific architecture of the processor to function correctly that, if executed by the processor, will cause the processor to perform operations including
      saving a processor state in a system memory and attempting to correct an error when a machine check error is generated by the processor, and
      receiving control and returning to the interrupted context of the processor by restoring the state of the processor when the error is determined to have been corrected;
   a second machine-readable medium coupled to the processor, the second machine-readable medium including only processor implementation-independent instructions not dependent on the specific architecture of the processor to function correctly that, if executed by the processor, will cause the processor to perform operations including
      receiving control from the first machine-readable medium;
      determining if the error has been corrected;
      transferring control to the first machine-readable medium if the error has been corrected.

15. The central processing unit (CPU) of claim 14, wherein the operations performed by the instructions provided by the second machine-readable medium further include requesting processor error record information from the first machine-readable medium.

16. The central processing unit (CPU) of claim 14, wherein the operations performed by the instructions provided by the first machine-readable medium further include attempting to contain the error if a second processor is coupled to the processor by requesting a rendezvous between the processor and the second processor.

17. The central processing unit (CPU) of claim 14, wherein the operations performed by the instructions provided by the second machine-readable medium further include providing an address of a location to save the processor State in the system memory to the first machine-readable medium.

18. The central processing unit (CPU) of claim 14, wherein attempting to correct the error is not done if an expected machine check indicator is set.

19. The central processing unit (CPU) of claim 14, wherein the instructions provided by the first and second machine-readable media are not cacheable by the processor.

20. The central processing unit (CPU) of claim 14, wherein the operations performed by the instructions provided by the second machine-readable medium further include if the error is uncorrected, passing control to an operating system error handler if present, otherwise, performing one of a halt and a reboot of the CPU.

* * * * *